US011457176B2

(12) United States Patent
Segal

(10) Patent No.: US 11,457,176 B2
(45) Date of Patent: *Sep. 27, 2022

(54) SYSTEM AND METHOD FOR PROVIDING AND INTERACTING WITH COORDINATED PRESENTATIONS

(71) Applicant: Touchcast, Inc., New York, NY (US)

(72) Inventor: Edo Segal, New York, NY (US)

(73) Assignee: TOUCHCAST, INC., New York, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/726,517

(22) Filed: Dec. 24, 2019

(65) Prior Publication Data

US 2020/0280697 A1 Sep. 3, 2020

Related U.S. Application Data

(63) Continuation of application No. 16/192,120, filed on Nov. 15, 2018, now Pat. No. 10,523,899, which is a
(Continued)

(51) Int. Cl.
*H04N 7/15* (2006.01)
*H04N 21/4782* (2011.01)
(Continued)

(52) U.S. Cl.
CPC ............. *H04N 7/15* (2013.01); *G06F 3/0482* (2013.01); *G06F 3/0488* (2013.01); *G06F 3/04817* (2013.01); *G06F 3/167* (2013.01); *G11B 27/031* (2013.01); *H04N 5/2222* (2013.01); *H04N 5/262* (2013.01); *H04N 5/265* (2013.01); *H04N 7/147* (2013.01); *H04N 7/155* (2013.01); *H04N 21/251* (2013.01); *H04N 21/2668* (2013.01); *H04N 21/4223* (2013.01); *H04N 21/42203* (2013.01); *H04N 21/4316* (2013.01);
(Continued)

(58) Field of Classification Search
None
See application file for complete search history.

(56) References Cited

U.S. PATENT DOCUMENTS 6,020,931 A 2/2000 Bilbrey et al.
7,216,092 B1 * 5/2007 Weber .................. G06Q 10/087
358/1.13
(Continued)

FOREIGN PATENT DOCUMENTS

GB 2 502 986 12/2013
WO WO 2010/141939 12/2010
(Continued)

*Primary Examiner* — Eileen M Adams
(74) *Attorney, Agent, or Firm* — Leason Ellis LLP

(57) ABSTRACT

A system and method provide customizable interactive audio/video content to each of a plurality of computing devices. When executing at least some code stored in the memory, a processor generates a coordinated presentation by integrating in the memory, via a video mixer, one or more images from a camera with content selected by at least one user. Further the at least one processor is configured to process the coordinated presentation to provide an abridged version of the coordinated presentation at at least one of the remote devices.

18 Claims, 10 Drawing Sheets

Related U.S. Application Data continuation of application No. 15/999,221, filed on Aug. 15, 2018, now abandoned, which is a continuation-in-part of application No. 16/002,668, filed on Jun. 7, 2018, now abandoned, and a continuation-in-part of application No. 16/002,701, filed on Jun. 7, 2018, now Pat. No. 10,531,044, which is a continuation of application No. 15/867,639, filed on Jan. 10, 2018, now Pat. No. 10,075,676, which is a continuation-in-part of application No. 15/683,403, filed on Aug. 22, 2017, now Pat. No. 10,033,967, which is a continuation of application No. 15/247,534, filed on Aug. 25, 2016, now Pat. No. 9,787,945, which is a continuation-in-part of application No. 14/833,984, filed on Aug. 24, 2015, now Pat. No. 9,661,256, which is a continuation-in-part of application No. 14/316,536, filed on Jun. 26, 2014, now Pat. No. 9,363,448.

(60) Provisional application No. 62/565,094, filed on Sep. 28, 2017, provisional application No. 62/545,994, filed on Aug. 15, 2017, provisional application No. 62/444,525, filed on Jan. 10, 2017, provisional application No. 62/329,081, filed on Apr. 28, 2016, provisional application No. 62/242,029, filed on Oct. 15, 2015, provisional application No. 62/209,727, filed on Aug. 25, 2015, provisional application No. 61/845,743, filed on Jul. 12, 2013, provisional application No. 61/839,757, filed on Jun. 26, 2013.

(51) Int. Cl.
| | | |
|---|---|---|
| *H04N 21/6587* | (2011.01) | |
| *H04N 21/4722* | (2011.01) | |
| *H04N 21/431* | (2011.01) | |
| *H04N 21/4788* | (2011.01) | |
| *G06F 3/16* | (2006.01) | |
| *H04N 5/222* | (2006.01) | |
| *G06F 3/0482* | (2013.01) | |
| *G11B 27/031* | (2006.01) | |
| *H04N 21/4223* | (2011.01) | |
| *H04N 21/422* | (2011.01) | |
| *H04N 21/2668* | (2011.01) | |
| *H04N 21/25* | (2011.01) | |
| *H04N 5/262* | (2006.01) | |
| *H04N 7/14* | (2006.01) | |
| *H04N 5/265* | (2006.01) | |
| *G06F 3/0488* | (2022.01) | |
| *G06F 3/04817* | (2022.01) | |
| *G06F 3/04883* | (2022.01) | |
| *H04N 21/47* | (2011.01) | |
| *H04N 21/478* | (2011.01) | |

(52) U.S. Cl.
CPC ..... *H04N 21/4722* (2013.01); *H04N 21/4782* (2013.01); *H04N 21/4788* (2013.01); *H04N 21/6587* (2013.01); *G06F 3/04883* (2013.01); *H04N 21/47* (2013.01); *H04N 21/478* (2013.01)

(56) References Cited

U.S. PATENT DOCUMENTS

| | | | |
|---|---|---|---|
| 7,577,978 | B1 | 8/2009 | Wistendahl et al. |
| 8,508,614 | B2 | 8/2013 | Segal |
| 8,584,164 | B2 | 11/2013 | Walter et al. |
| 8,745,657 | B2 | 6/2014 | Chalozin et al. |
| 9,036,043 | B2 | 5/2015 | Segal |
| 9,363,448 | B2 * | 6/2016 | Segal ................. H04N 5/2222 |
| 9,661,256 | B2 | 5/2017 | Segal |
| 9,787,945 | B2 | 10/2017 | Segal |
| 9,852,764 | B2 | 12/2017 | Segal |
| 10,033,967 | B2 | 7/2018 | Segal |
| 10,075,676 | B2 | 9/2018 | Segal |
| 10,523,899 | B2 * | 12/2019 | Segal ............... H04N 21/4722 |
| 2001/0006382 | A1 | 7/2001 | Sevat |
| 2002/0186233 | A1 | 12/2002 | Holtz et al. |
| 2004/0015398 | A1 | 1/2004 | Hayward |
| 2005/0137958 | A1 | 6/2005 | Huber et al. |
| 2005/0204438 | A1 | 9/2005 | Wang |
| 2006/0075668 | A1 | 4/2006 | Sauer |
| 2006/0090141 | A1 * | 4/2006 | Loui ..................... G06F 16/447 |
| | | | 715/764 |
| 2007/0089134 | A1 | 4/2007 | Stearns |
| 2007/0266322 | A1 | 11/2007 | Tretter |
| 2008/0033806 | A1 | 2/2008 | Howe |
| 2008/0096175 | A1 | 4/2008 | Du Toit Ilne et al. |
| 2008/0109300 | A1 | 5/2008 | Bason |
| 2008/0120675 | A1 | 5/2008 | Morad et al. |
| 2008/0150913 | A1 | 6/2008 | Bell et al. |
| 2009/0066690 | A1 | 3/2009 | Harrison |
| 2009/0153804 | A1 | 6/2009 | Giraldo et al. |
| 2009/0237565 | A1 | 9/2009 | Staker et al. |
| 2009/0327418 | A1 * | 12/2009 | Zhang ..................... H04N 7/15 |
| | | | 709/204 |
| 2010/0083191 | A1 | 4/2010 | Marshall |
| 2010/0174783 | A1 | 7/2010 | Zarom |
| 2011/0052144 | A1 | 3/2011 | Abbas |
| 2011/0161990 | A1 | 6/2011 | Smith |
| 2011/0202827 | A1 | 8/2011 | Freishtat |
| 2011/0249075 | A1 | 10/2011 | Abuan et al. |
| 2011/0254912 | A1 | 10/2011 | Mock et al. |
| 2011/0298935 | A1 | 12/2011 | Segal |
| 2012/0158524 | A1 | 6/2012 | Hintz |
| 2013/0031593 | A1 | 1/2013 | Booth |
| 2013/0073985 | A1 | 3/2013 | Hamlin et al. |
| 2013/0117129 | A1 | 5/2013 | Brown et al. |
| 2013/0155187 | A1 | 6/2013 | Skyberg |
| 2013/0173355 | A1 | 7/2013 | Barcenas |
| 2013/0212615 | A1 | 8/2013 | Schultz |
| 2014/0002581 | A1 | 1/2014 | Bear et al. |
| 2014/0086557 | A1 | 3/2014 | Yu et al. |
| 2014/0132702 | A1 | 5/2014 | Leibovich et al. |
| 2014/0215542 | A1 | 7/2014 | Terpe |
| 2015/0149930 | A1 | 5/2015 | Walkin et al. |
| 2016/0080835 | A1 | 3/2016 | von Sneidern et al. |
| 2016/0098941 | A1 | 4/2016 | Kerluke |
| 2016/0300135 | A1 | 10/2016 | Moudy et al. |
| 2018/0150985 | A1 | 5/2018 | McDonald |
| 2018/0352194 | A1 | 12/2018 | Segal et al. |

FOREIGN PATENT DOCUMENTS

| | | |
|---|---|---|
| WO | WO 2012/139082 | 10/2012 |
| WO | WO 2013/076478 | 5/2013 |
| WO | WO 2013/167901 | 11/2013 |

* cited by examiner

SYSTEM AND METHOD FOR PROVIDING AND INTERACTING WITH COORDINATED PRESENTATIONS

CROSS-REFERENCE TO RELATED APPLICATIONS

This application is a continuation of U.S. Non-Provisional patent application Ser. No. 16/192,120, filed Nov. 15, 2018, now U.S. Pat. No. 10,523,899, issued Dec. 31, 2019, which is a continuation of U.S. Non-Provisional patent application Ser. No. 15/999,221, filed Aug. 15, 2018, which is based on and claims priority to U.S. Provisional Patent Application No. 62/545,994, filed Aug. 15, 2017. Further, U.S. Non-Provisional patent application Ser. No. 15/999,221 is a continuation-in-part of U.S. Non-Provisional patent application Ser. No. 16/002,701, filed Jun. 7, 2018, which is a continuation of U.S. Non-Provisional patent application Ser. No. 15/867,639, filed Jan. 10, 2018, which is based on and claims priority to U.S. Provisional Patent Application No. 62/444,525, filed Jan. 10, 2017, U.S. Provisional Patent Application No. 62/545,994, filed Aug. 15, 2017, and U.S. Provisional Patent Application No. 62/565,094, filed Sep. 28, 2017. U.S. Non-Provisional patent application Ser. No. 15/867,639 further is a continuation-in-part of U.S. patent application Ser. No. 15/683,403, filed Aug. 22, 2017, now U.S. Pat. No. 10,033,967, issued Jul. 24, 2018, which is a continuation of U.S. Non-Provisional patent application Ser. No. 15/247,534, filed Aug. 25, 2016, now U.S. Pat. No. 9,787,945, issued Oct. 10, 2017, which is based on and claims priority to U.S. Provisional Patent Application No. 62/209,727, filed Aug. 25, 2015, U.S. Provisional Patent Application No. 62/242,029, filed Oct. 15, 2015, and U.S. Provisional Patent Application No. 62/329,081, filed Apr. 28, 2016. Further, U.S. patent application Ser. No. 15/247,534 is a continuation-in-part of U.S. Non-Provisional patent application Ser. No. 14/833,984, filed Aug. 24, 2015, now U.S. Pat. No. 9,661,256, issued May 23, 2017, which is a continuation-in-part of U.S. Non-Provisional patent application Ser. No. 14/316,536, filed Jun. 26, 2014, now U.S. Pat. No. 9,363,448, issued Jun. 7, 2016, which is based on and claims priority to U.S. Provisional Patent Application No. 61/839,757, filed Jun. 26, 2013 and U.S. Provisional Application No. 61/845,743, filed Jul. 12, 2013, Further, U.S. Non-Provisional patent application Ser. No. 15/999,221 is a continuation-in-part of U.S. Non Provisional patent application Ser. No. 16/002,668, filed Jun. 7, 2018, the contents of all of which are incorporated by reference in their respective entireties, as if set forth herein.

This application is also based on and incorporates by reference U.S. Non-Provisional application Ser. No. 15/608,932, filed May 30, 2017, now U.S. Pat. No. 9,852,764, issued Dec. 26, 2017, which is a continuation-in-part of U.S. patent application Ser. No. 14/813,974, filed Jul. 30, 2015, now U.S. Pat. No. 9,666,231, issued May 30, 2017, which is based on and claims priority to U.S. Provisional Patent Application Ser. No. 62/031,114, filed on Jul. 30, 2014, and Ser. No. 14/813,974 is a continuation-in-part of U.S. patent application Ser. No. 14/316,536, filed Jun. 26, 2014; further, U.S. Non-Provisional application Ser. No. 15/608,932 is a continuation-in-part of U.S. patent application Ser. No. 15/247,534, filed Aug. 25, 2016, the entire contents of all of which are incorporated by reference as if expressly set forth in their respective entireties herein.

FIELD

The present application relates, generally, to content presentation and, more particularly, to a system and method for providing and interacting with content via interactive communication sessions.

BACKGROUND

Interactive and supplemental content that has been made available to viewers has been done through a decoupled, separate communication channel. For instance, a producer can provide a separate communication channel with data, a video stream, or both at a URL associated with the broadcast. For example, a television station can have on-air programming and also provide supplemental content available through a website. Apart from sponsoring both sources of information, these communication channels are generally decoupled from one another. In other words, the broadcaster has only an indirect relationship to the viewer with regard to any supplemental content.

It is with respect to these and other considerations that the disclosure made herein is presented.

BRIEF SUMMARY

In one or more implementations, a system and method provide respectively customizable interactive audio/video content to each of a plurality of computing devices. In connection with a system, at least one processor, a memory that is accessible by the at least one processor, a camera that is accessible by the at least one processor and that is configured to capture one or more images, a display that is accessible by the at least one processor and that is configured to display content, a touch-screen interface accessible by the at least one processor and that is configured to receive input from a user, and a video mixer module stored in the memory that is configured to mix graphical content are provided. When executing at least some code stored in the memory, the at least one processor is configured to generate a coordinated presentation by integrating in the memory, via the video mixer, one or more images from the camera with content selected by at least one user, wherein the coordinated presentation is configured to enable respective interaction at each of a plurality of remote devices, such that results of a respective interaction at a particular remote device are viewable at the particular remote device but are not viewable at other of the remote devices, wherein the coordinated presentation is further configured to be transmitted to the one or more remote devices. Further the at least one processor is configured to process the coordinated presentation to provide an abridged version of the coordinated presentation at at least one of the remote devices.

In one or more implementations, the abridged version is provided in a graphical user interface configured with a timeline. Furthermore, the coordinated presentation can be processed by the at least one processor by determining a plurality of events in the coordinated presentation, indexing each of the plurality of events; and providing, in a timeline configured in a graphical user interface, the abridged version of the coordinated presentation as a function of the indexed events.

Other features of the present application are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION OF THE EMBODIMENTS

Figure 1:
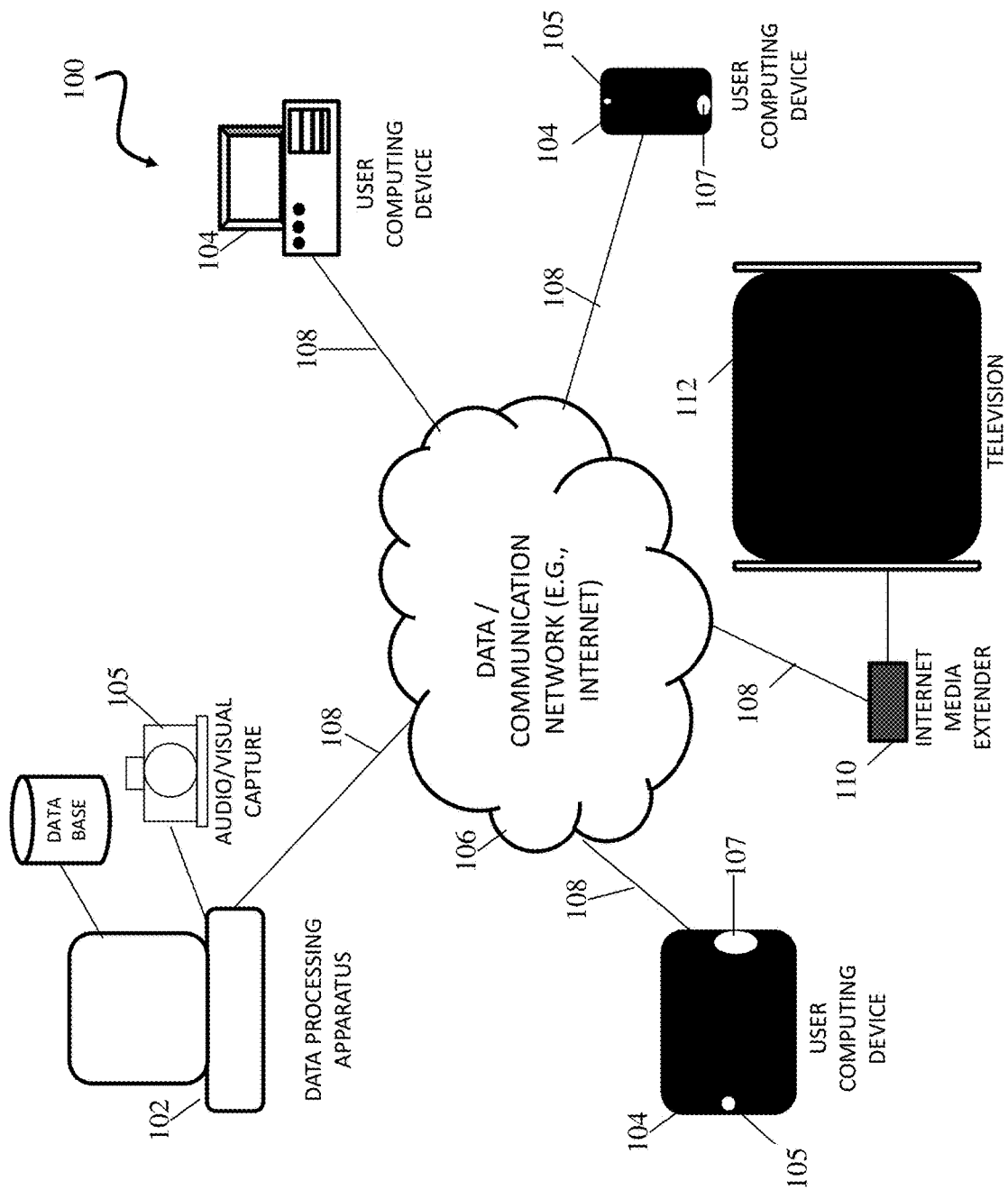
FIG. 1 is a diagram illustrating an example hardware arrangement that operates for providing the systems and methods disclosed herein.

By way of introduction and overview, in one or more implementations the present application provides systems and methods for authoring and playing video that can be layered with interactive content, including content that is available over one or more data communication networks, such as the Internet. Devices operating, for example, iOS, ANDROID, WINDOWS MOBILE, BLACKBERRY, MAC OS, WINDOWS or other operating systems are configured to provide functionality, such as an authoring tool and interface for developing distributable coordinated presentations including videos that include customizable and interactive features for use by one or more end-users that receive the presentations. Further, the software applications provide a viewing/interactive tool, referred to herein, generally, as a "consuming" interface, for end-users who receive videos that are authored in accordance with the present application. Using the client interface, users may interact with videos as a function of touch and gestures, as well as other suitable interfaces, such as a mouse, trackball, keyboard or other input. Some functionality available for end-users is defined by an author.

In accordance with the teachings herein, implementations of the present application provide a simple to use, informing and entertaining communications experience that incorporates content from a plurality of computing devices, e.g., smartphones, tablets, laptops and desktops, and enables live sharing in a real-time and conferencing capability therefore.

In one or more implementations, a video mixer module can be provided that comprises instructions executing so as to configure a processor to integrate a plurality of images captured by a camera together with a portion of the curated content via a user selection from a touch-screen interface, and thereby to generate a coordinated presentation that is capable of transmission to and receipt by one or more remote devices; and wherein the coordinated presentation is configured to enable interaction with the portion of the curated content at each of the remote devices such that results of a respective interaction at a particular remote device are viewable at the particular remote device but are not viewable at (a) other of the remote devices and (b) the display.

In one or more implementations, coordinated presentations may be configured with interactive options, which may include images, video content, website content, or computer programs (collectively referred to herein, generally, as "vApps"). An authoring tool can be integrated with a player tool, and the tools enable one or more vApps to be embedded in video or, in one or more implementations, a code is embedded in the video for enhanced functionality. For example, a play/pause button can be provided that enables a user to play or pause playback of a coordinated presentation. A timeline function can be provided that identifies a current time location within a coordinated presentation as well as to navigate therein. vApp icons can be provided that represent vApps that are included with the current coordinated presentation at respective time locations therein. In accordance with one or more implementations, as a respective icon is selected by the user, the coordinated presentation jumps to the corresponding time location, and the user can interact with the respective vApp. Information can be time coded in video, and selectable user interactive elements for navigation/time can be provided.

In one or more implementations, the present application includes and improves functionality for chroma key composting, often referred to as use of a "green screen" and/or "blue screen." In one or more implementations, a computing device configured with an authoring tool and interface for developing distributable coordinated presentations manipulates background content provided in a coordinated presentation as a function of the movement and angle the camera(s) used during recording of the coordinated presentation. In addition or in the alternative to basing the manipulation of background content on movement and/or the angle of a camera used during recording, one or more foreground elements can be the basis of such background manipulation. Moreover, an algorithm, such as implemented as a function of artificial intelligence, can serve to separate foreground subject(s) from the background, substantially automatically.

Thus, a module executing on a device configured with an authoring tool detects an angle of view, such as a function of camera position and/or angle of view of one or more foreground elements, and manipulates the appearance of the composited background content to eliminate an otherwise static appearance of the background content. The background content can be, for example, a composited in place of background provided in a respective color range (e.g., green). By manipulating the background content in a dynamic way, the background content eliminates a static appearance that otherwise decreases the realism of the imagery, and requires more from the viewer to suspend disbelief. By adjusting and/or manipulating the virtual background in association with movement or visual appearance of foreground elements, the coordinated presentation appears significantly more real to the viewer.

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present application.

Referring to FIG. 1 a diagram is provided of an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high-quality audio/video content.

With continued reference to FIG. 1, data processing apparatus 102 can be configured to access one or more databases for the present application, including image files, video content, documents, audio/video recordings, metadata and other information. In addition, data processing apparatus 102 can be configured to access Internet websites and other online content. It is contemplated that data processing apparatus 102 can access any required databases via communication network 106 or any other communication network to which data processing apparatus 102 has access. Data processing apparatus 102 can communicate with devices including those that comprise databases, using any known communication method, including Ethernet, direct serial, parallel, universal serial bus ("USB") interface, and/or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other software and/or hardware tools, to provide received data on audio/visual devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In one or more implementations, the present application provides improved processing techniques to prevent packet loss, to improve handling interruptions in communications, and other issues associated with wireless technology.

According to an embodiment of the present application, user computing device 104 provides user access to data processing apparatus 102 for the purpose of receiving and providing information. Examples and description of specific functionality provided by system 100, and in particular data processing apparatuses 102, is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., un-switched data connection 108. Permanent connectivity ensures that access to data processing apparatuses 102 is always available.

Figure 2:
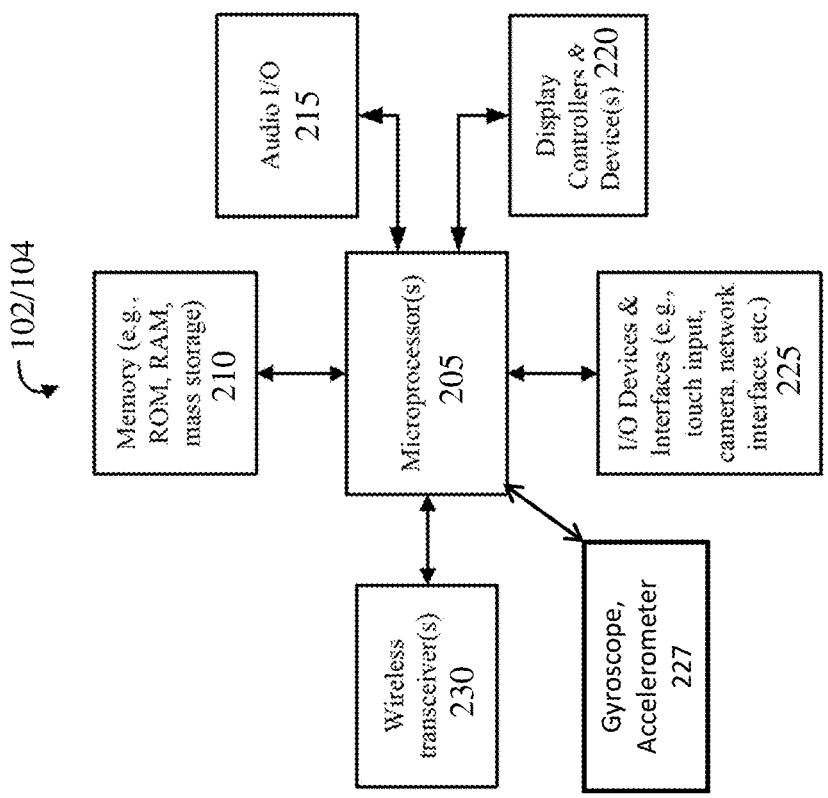
FIG. 2 is a block diagram that illustrates functional elements of a computing device in accordance with an embodiment.

FIG. 2 illustrates, in block diagram form, an exemplary data processing apparatus 102 and/or user computing device 104 that can provide functionality in accordance with interactive conferencing, as described herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type of memory.

The data processing apparatus 102 and/or user computing device 104 also includes an audio input/output subsystem 215 which may include a microphone and/or a speaker for, for example, playing back music, providing telephone or voice/video chat functionality through the speaker and microphone, etc.

A display controller and display device 220 provides a visual user interface for the user; this user interface may include a graphical user interface which, for example, is similar to that shown on a Macintosh computer when running Mac OS operating system software or an iPad, iPhone, or similar device when running mobile computing device operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network. In addition, Gyroscope/Accelerometer 235 can be provided.

It will be appreciated that one or more buses, may be used to interconnect the various modules in the block diagram shown in FIG. 2.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network.

Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

It will be appreciated that additional components, not shown, may also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

In one or more implementations, the present application provides improved processing techniques to prevent packet loss, to improve handling interruptions in communications, to reduce or eliminate latency and other issues associated with wireless technology. For example, in one or more implementations Real Time Streaming Protocol (RTSP) can be implemented, for example, for sharing output associated with a camera, microphone and/or other output devices configured with a computing device. RTSP is an effective (though not necessary in all implementations) network control protocol for entertainment and communications systems, including in connection with streaming output. RTSP is used in the present application, at least in part, for establishing and controlling media sessions between various end points, including user computing devise 104, Internet media extender 110 and data processing apparatus 102.

In addition to RTSP, one or more implementations of the present application can be configured to use Web Real-Time Communication ("WebRTC") to support browser-to-browser applications, including in connection with voice, video chat, and peer-to-peer ("P2P") file sharing. Thus, the present application avoids a need for either internal or external plugins to connect endpoints, including for voice/video or other communication sharing. In one or more implementations, the present application implements WebRTC for applications and/or Internet web sites to capture and/or stream audio and/or video media, as well as to exchange data between browsers without requiring an intermediary. The set of standards that comprises WebRTC makes it possible to share data and perform teleconferencing peer-to-peer, without requiring that the user install plug-ins or any other third-party software. WebRTC includes several interrelated APIs and protocols which work together.

In one or more implementations, at least one of the Internet media extender components 110 includes APPLE TV. After an Internet media extender 110 is installed (e.g., connected to a television set and connected to a Wi-Fi, Ethernet or other local area network), a software application is installed on the Internet media extender 110, as well as at least one mobile computing device 104. For example, a user downloads and installs an app to an Internet media extender 110 ("TV APP") and also installs an app to a user computing device 104 ("MOBILE APP"). Once installed, and the first time the TV APP is executed, the user is prompted to launch the MOBILE APP. Thereafter, the mobile computing device 104 (e.g., an iPhone) is automatically detected by the TV APP. During subsequent uses, video content that is provided as a function audio/video output from the computing device (e.g., iPhone) is provided instantly on the television that is connected to the Internet media extender 110. In operation, audio/video feed from the iPhone is provided on big screen. The TV APP and the MOBILE APP may be configured as a single application (e.g., distributed as a single application), or may be provided as separate applications.

In one or more implementations, each of a plurality of participants operating, for example, user computing device 104 participate in an interactive video conference at least in part by establishing a data/communication session with the data processing apparatus 102. A form of a star topology is established, in which data processing apparatus 102 is communicatively connected to each of a plurality of respective user computing devices 104 and respectfully receives audio/video feed from each device, such as provided as a function of input from a respective camera and/or microphone.

Thus, in one or more implementations, the present application can implement a star topology in which a central node (e.g., a data processing apparatus 102) receives low resolution of video content from each of a plurality of computing devices (e.g., client devices 104). The central node can be configured by executing program instructions to compose a single video comprising all of the video received from the various devices. The single video can be provided substantially in real-time as one high-definition ("HD") video. The central node can send the HD video to all of the computing devices operated by the various users, as well as to the device operated by the "presenter."

Continuing with the respective one or more implementations described above, each of the respective individual feeds from the respective devices is received by the data processing apparatus 102 and the video feeds (including, for example, images) are composed into a single video stream. The video stream can be configured as a high definition stream (e.g., 1280×720 or higher resolution), and output to each of at least some of the respective user computing devices 104.

Figure 3:
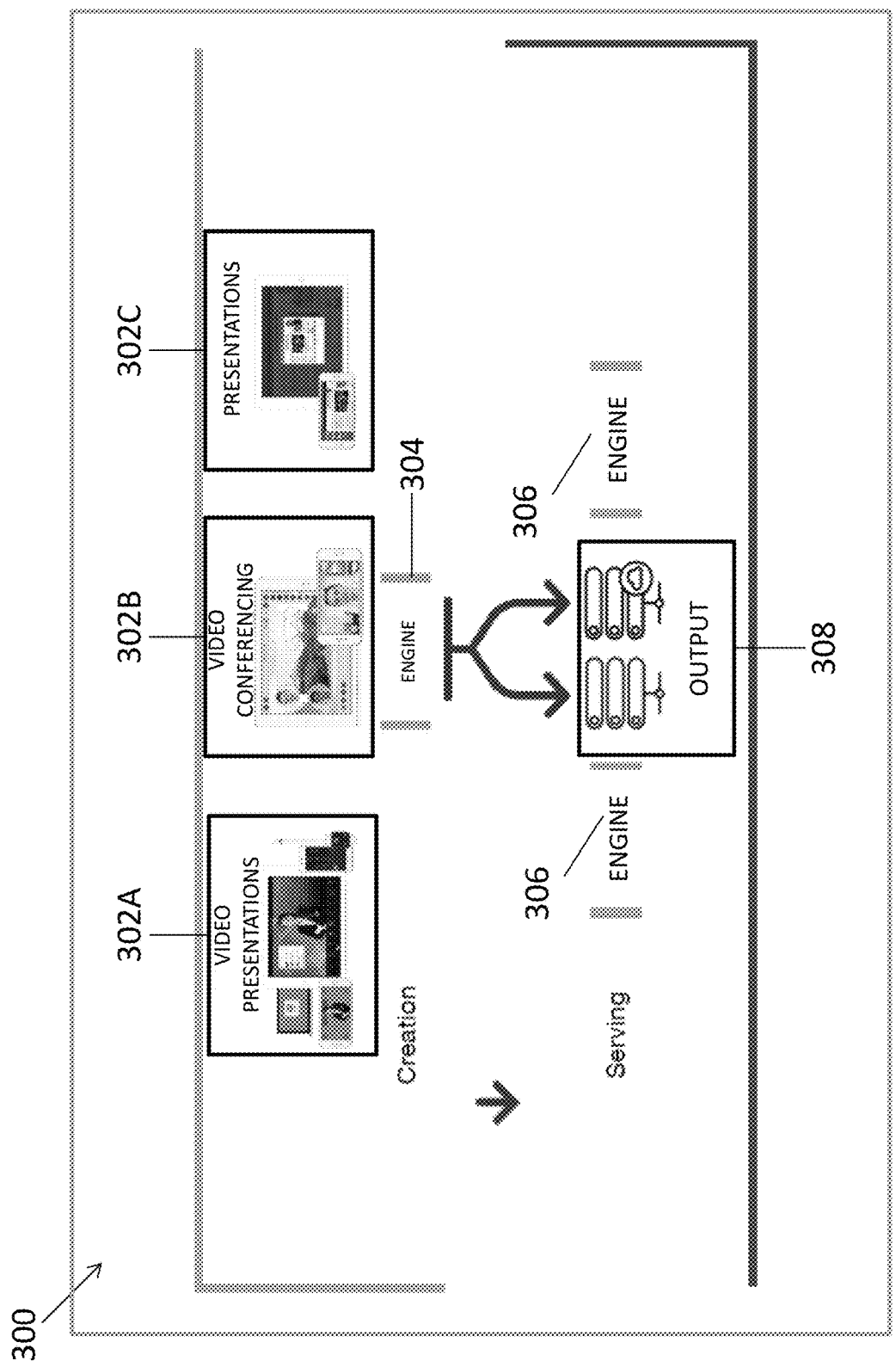
FIGS. 3-5 are example high-level diagrams that illustrate interactivity between and functionality of various modules in connection with one or more implementations of the present application.
Figure 4:
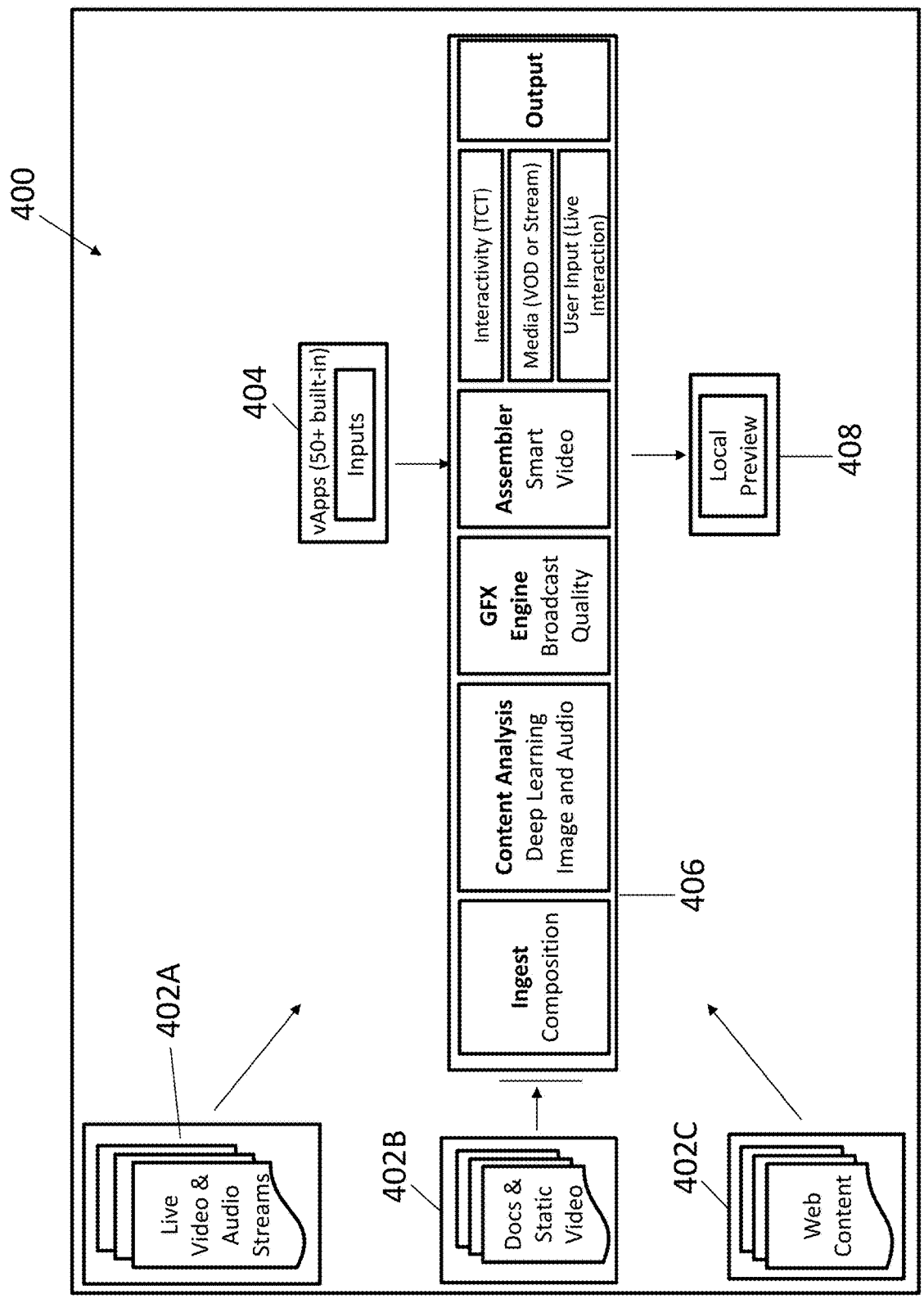
Figure 5:
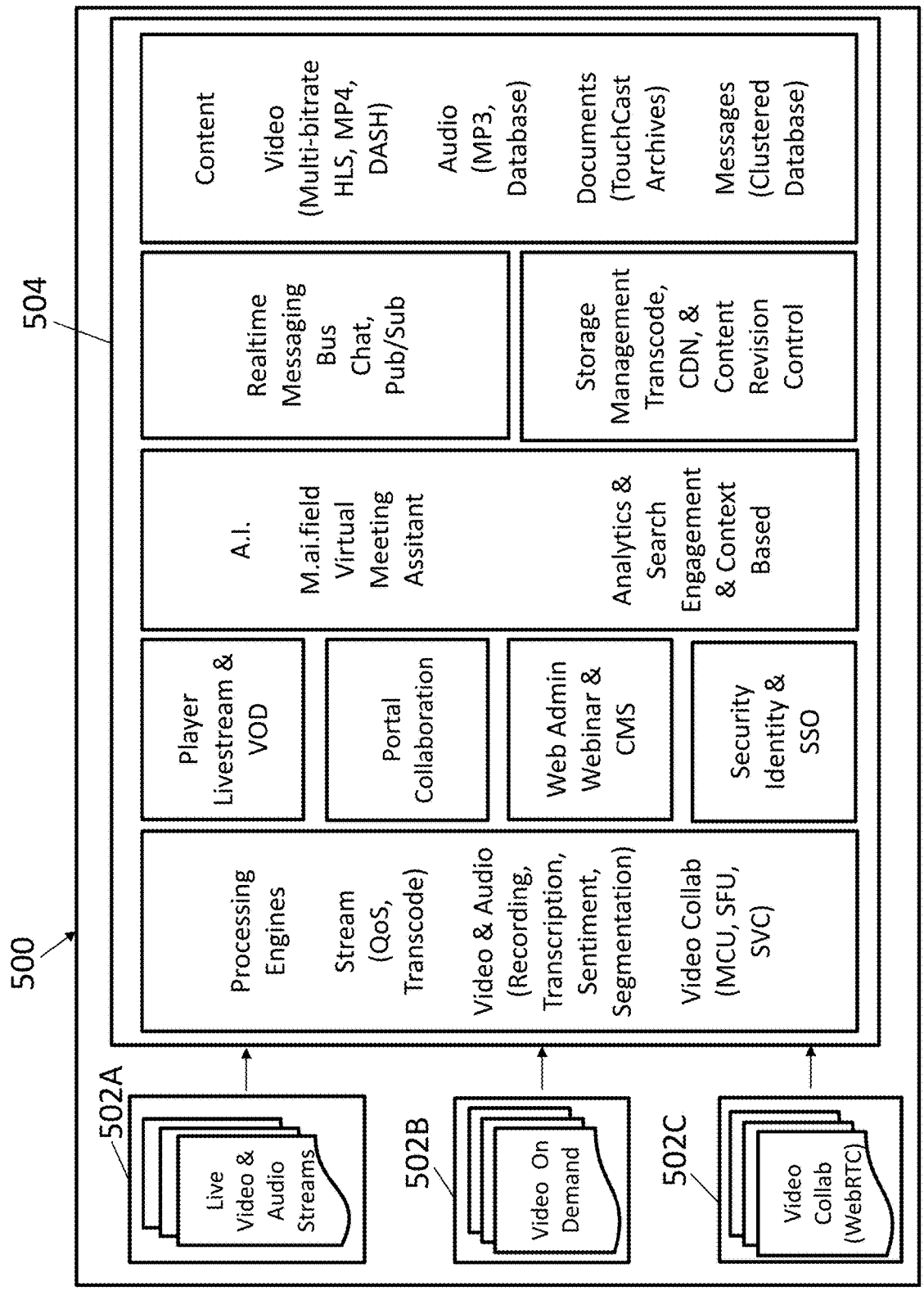

FIGS. 3-5 are example high-level diagrams that illustrate interactivity between and functionality of various modules in connection with one or more implementations of the present application, and that enhance production value and assist in virtually any form of content. In one or more implementations, events are packaged into memory for useful media for future use, such as on-demand content and/or an extension of organizational-based content. In the example block diagram 300 illustrated in FIG. 3, coordinated presentations can be made of one or more video presentations 302, interactive video conferencing 302 and other presentations 302, and interactive video can be generated therefrom and created via one or more respective layers, including video presentation layer 302A, video conferencing layer 302B and presentation layer 302C. Presentation layer 302C can include, for example, online applications that are suitable for generating slide decks, outlines, or other suitable digital aids. In certain implementations, a plurality of parties can connect to a respective videoconferencing session in accordance with the present application. In such instances, a client/server model can be effective for handling the respective devices and management of data and communications thereof. In other certain implementations, one or more individuals connect to a respective videoconferencing session in accordance with the present application. In such cases, aP2P framework can be effective in an implementation. Interactivity can be developed and/or controlled by vApps, and all interactions of users associated with developed video and/or viewing thereof can be stored. In one or more implementations, metadata can be generated that represents such interactions and/or events that are part of a respective video presentation. A video layer, in one or more implementations, includes a composition of all elements including live, streamed content, as well as pre-recorded video and audio. Representations of all the included content can be packaged into a single video file, as well as metadata and other useful information associated with the content. For example, user input stores data streams generated during a respective interactive video, such as whiteboard drawings and video viewer feedback during the live streaming sessions. Engine 304, for example, can include an endpoint configured as one or more backend servers that supports and provides functionality associated with respective native applications (e.g., 302A, 302B and 302C). Engine 306, for example, can include a real-time collaboration platform configured as one or more scalable backend servers and that is usable in consumer-based and/or enterprise operations. The serving component of engine 306 can process output from engine 304, for example, for use such as shown and described herein.

FIG. 4 is an example block diagram showing alternative components and modules 400 associated with one or more implementations of the present application. Modules 402A, 402B and 402C can produce or provide live video and audio streams (402A), documents files and static video (402B), and web content (402C). Other inputs 404, such as vApps can be provided as well. Such content and inputs can be received by module 406 that includes an "ingest" module for respective compositions, a content analysis module that can include artificial intelligence (e.g., "deep learning"), for example associated with image and audio content, a graphics effects (GFX Engine) module that can output high-quality (broadcast quality or better) content. Moreover, an assembler module can be included to package the respective content, metadata, and other information into a single file (e.g., "smart video"). In one or more implementations, a proprietary file format can be used and/or generated, such as a ".TCT" file format that is associated with engine 306, and operable to be played on a content player application or other suitable software, for example operating on a user computing device 104, and that is configured to play such .TCT file. Media (such as interactive video, video-on-demand (VOD) and/or user input (live interaction) can be bundled into output 308. Such output can be previewed locally (408) and/or played on a player application operating on user computing device 104.

With reference to FIG. 5, a plurality of modules 500 are illustrated in accordance with one or more implementations of the present application. Video and audio streams module 502A, video-on-demand module 502B and video collaboration 502C, are represented to provide content to modules 504, such as to processing engines for eventual use, such as in a player (for a live stream and or video-on-demand), a portal (such as for collaboration), web administration (such as for webinars and/content management systems) and/or security applications (e.g., identity and single sign-on (SSO)). In addition, artificial intelligence modules are supported and/or provided, for example, for virtual meeting assistants, and learning modules such as in connection with analytics and for providing search functionality for users in connection with packaged output 308. Artificial intelligence modules are useful in addition for user engagement and for context-based functionality (e.g., searching). Also illustrated in modules section 504 is a communications module, such as a real-time messaging bus for chat and various publishing and subscription implementations (Pub/Sub). Storage management modules are also provided, such as to transcode content (e.g., from one encoding format to another), and content delivery networks (CDN).

In one or more implementations, the respective modules illustrated in FIGS. 3-5 provide output that is packaged with metadata and usable information for, for example, a player application operating on a user computing device 104. The player application operating on user computing device 104, for example, "ingests" the content and pushes out interactive "smart" video. A ".TCT" file, for example, has video or other multimedia, textual and/or static content, as well as metadata and other instructional information, and is recognized and played on such player application. In one or more implementations, optical character recognition (OCR), voice recognition and/or audio recognition operations can be executed by one or more processors operating on user computing device 104 and/or data processing apparatus 102 to generate transcriptions, which can be formatted as metadata, of content contained in the ".TCT" file. In one or more implementations, a player application operating on user computing device 104 can be configured with instructions that, when executed by computing device 104, provide search functionality for the user to locate content and material contained within the file. Upon receipt of search criteria, such as keywords or other search terms, search functionality can be executed within the player application to locate corresponding content within the video content packaged file.

One or more implementations of the present application, artificial intelligence module(s), such as provided via modules 504, form various machine learning, including deep learning, such as in connection with convolutional and other neural networks, and results in detecting and characterizing sentiment in connection with one or more images, including was in video. For example, analysis of images that include smiling, frowning, crying, wincing or other expressions is performed to identify specific kinds of content and to generate suitable metadata, such as to enable users to locate such content within video. Moreover, biometric information, such as relating to a user's heartrate, heart rhythm, perspiration, or other metabolic characteristics can be detected, such as via a camera configured with a smartphone or other mobile computing device. Metadata can be generated automatically as a function of modules 406 and 504 via engines 304 and 306, for example. Moreover, as content is edited (such as video, audio or images) in a packaged video file, the metadata can be automatically edited as well to provide functionality and operations, such as shown and described herein, and kept up-to-date as such files are edited.

Thus, in one or more implementations, as a player application operating, for example, on a user computing device 104 ingests a packaged multimedia file, such as interactive video shown and described herein, voice recognition, optical character recognition or other processing occurs substantially in real-time to generate analytics for additional functionality. One of ordinary skill will recognize that such a player application operating on a user computing device 104 can be configured as a client application running as a stand-alone application or a mobile app, or may be operating in an online environment, such as via a web browser or other suitable online software application.

In one or more implementations, the present application provides a sophisticated database management environment that operates substantially in real-time and on a plurality of respective user computing devices 104. Interactive video content can be provided in a player application with a set of graphical user controls, such as to represent a timeline of content and events contained within the interactive video. Additionally, respective events and/or content can be indexed within the timeline and user-defined weights can be applied thereto that represent a degree of interest in respective events and/or content. An event can be defined automatically and in various ways, such as when a change in content is detected in the interactive video. A change in content can include, for example, a new presentation slide being displayed. Other examples of changes in content can include a different person speaking in a videoconference session or a video presentation. Yet another example can include user interaction in connection with a videoconference or video presentation. For example, a videoconference that has been packaged for distribution in connection with the teachings herein may include, at one point during the session, a heated exchange among the respective participants. An event can be defined as the moment when the heated exchange begins. Countless other events and content can be identified and defined automatically and/or manually in connection with the teachings herein.

Moreover, coefficients can be assigned to be used as weighting indicators, which can be applied in one or more formulas in connection with providing respective abridged versions of the interactive video substantially in real-time. Furthermore, one or more algorithms can apply variable and changeable parameters to provide a customizable version of interactive video content, such as to instantiate specific shortened versions of interactive video that is suitable for many respective individuals' tastes.

For example, a full interactive video is 60 minutes long and a user desires to view an abridged version that is only 5 minutes long. The interactive video content has been identified by the player application operating on the user computing device 104 (as a function of modules executing by respective engines, described herein) to include 13 respective events. The user identifies respective events that are of particular interest, and coefficients are assigned to the respective events (automatically and/or manually). One event, in particular, is identified as occurring at a moment when a particular presentation slide is displayed, and is assigned a high coefficient value (such as 1.0). A second event, identified as occurring at a moment when a particular video link is displayed, is assigned a lower coefficient value (such as 0.5), while yet a third event, identified as occurring when a particular person speaks is assigned a still lower coefficient value (such as 0.25).

In one or more implementations of the present application, and abridged version of interactive video can be provided as a function of predefined coefficients and an amount of time that is defined as a function of the coefficients to play the interactive video from a respective time position based on occurrence of a respective event. Continuing with the above example and applying the respective coefficients to the respective events identified by the user, upon occurrence of the first event when the particular presentation slide is displayed, the interactive video plays for a full minute (1 minute * 1.0). Upon occurrence of the second event, the interactive video plays from the moment of the second event for 30 seconds (1 minute *0.50). Upon occurrence of the third event, the interactive video play from the moment of the third event for 15 seconds (1 minute *0.25). In the interactive video of the present example, there is one occurrence of the first event, there are four occurrences of the second event and there are eight occurrences of the third event. The resulting formula is:

(1(occurrence)*1.0(minute))+(4(occurrences)*0.50 (minute))+(8(occurrences)*0.25(minute)); or 1 minute+2 minutes+2 minutes=5 minutes.

Thus, a one-hour interactive video is abridged into a five-minute video and includes only the respective content desired by the user as a function of processing the interactive video, such as by a player application operating on a user computing device 104 to identify particular events and content as a function of metadata and other information packaged with the interactive video during creation.

Of course, one of ordinary skill in the art will recognize that the above example is non-limiting and that countless events and kinds of content can be defined and weighted by users to generate abridged versions of the interactive video on demand. The respective parameters that are used for defining events and content, as well as coefficients and durations of video to be played can be customized for particular use. In one or more implementations, a dashboard can be provided that includes selectable graphical screen controls, such as sliders and buttons, that enable users to customize variables and settings in accordance with the present application.

In addition, the present application can be configured so that the player application operating, for example, on user computing device 104 outputs the interactive video at variable speed and rates. For example, a user can select an option that instructs the player application to play the video plays at 1.5 rate, 5.0, rate, 10.0 rate, 20.0 rate or faster. Similarly, a user can define that video plays slower than normal 1.0 rate, such as 0.75 rate or slower. Moreover, the present application can include one or more instructions executing on user computing device 104 to configure the player application to skip over specific content. For example, results of analysis occurring via engines 304 and 306 (e.g., via metadata packaged with interactive video in a respective .TCT file) identifies when moments of silence occur, such as when no person is speaking. During such moments, the player application operating user computing device 104 can be configured to skip over such portions in order to provide an abridged version of the interactive video. This eliminates dead time or other portions of the interactive video that would be undesirable for viewing and decreases the amount of time that would otherwise be required to view the interactive video.

Accordingly, content analysis is provided in connection with generation of interactive video and playback thereof. Many variables can be accounted for in connection with the present application, such as the quality of a user's microphone, the sharpness of a respective image, a reaction from a specific user, or other contextual elements. In one or more implementations, processing occurs "locally" on user computing device 104 which decreases a demand on bandwidth requirements and cloud-based activity, which improves efficiency and speed. By providing self-contained interactive video having metadata and instructional information packaged therewith in a single file, no additional resources outside of the player application operating on the user computing device 104 are needed. This is recognized by the inventor as an improvement over computing operations and functionality in accordance with the present teachings, including to provide significant time-savings without losing context or meaning in connection with interactive (and/or non-interactive) video content.

It will be appreciated by one of ordinary skill that countless sessions can be defined for topics of all sorts and usable for respective groups of users. Demarcating individual sessions in accordance with the present application is usable in the consumer and enterprise markets alike, and solves a long felt need associated with controlled communication sessions including interactive video among respective individuals and parties.

Figure 6:
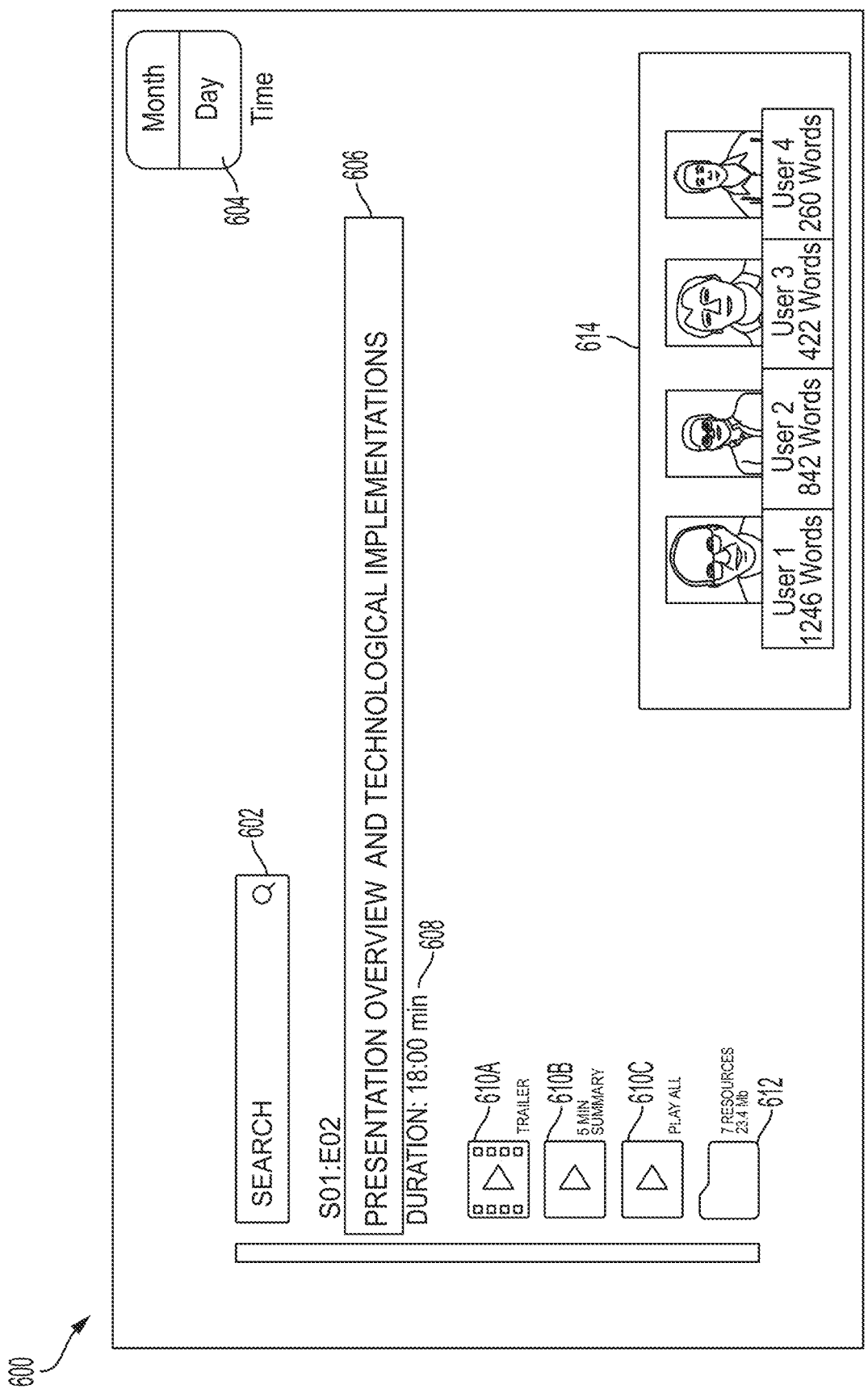
FIGS. 6-9 illustrate data entry display screens representing one or more implementations of the present application.

FIGS. 6-9 illustrate display screens associated with a player application operating on a user computing device 104, in connection with one or more implementations of the present application. FIG. 6 illustrates, for example, an example display screen 600 that includes various interactive graphical screen controls for a user to identify events and content associated with a respective interactive video. For example, search box 602 is configured to receive search terms, such as keywords, from a user searching for particular content and events in an interactive video file. Further, month day and time control 604 identifies a particular time, which may be the current time and date, a time and date when the video was created, ingested, edited, or other suitable time and date. Title 606 identifies a name for the respective interactive video, and duration 608 identifies the length of time of the video. In the example illustrated in display screen 600, three options are provided for a user to view the interactive video: trailer option 610A, 5 minute summary option 610B or play all option 610C. Trailer option 610A can provide an abridged version of the interactive video that identifies automatically selected portions that include event and content deemed relevant. 5 minute summary option 610B, when selected, can provide an abridged version of the interactive video that lasts for five minutes and includes portions of the interactive video in accordance with weighted coefficients and selected events and content, such as described herein. Play all option 610C, when selected, placed the entire interactive video unabridged. Moreover, resources option 612, when selected, provides access to respective content, such as presentation slides that were displayed in an interactive video. Other options provided by resources option 612 can include, for example, identified events and content, as well as access to various other materials for users. Moreover, users section 614 identifies a plurality of users who are featured in the interactive video, for example who participated in an interactive video conferencing session, as well as their names and their amounts of participation measured in numbers of words. User 1, for example is featured the most with 1246 words, user 2 is featured next most with 842 words, and users 3 and 4 with 422 words and 260 words, respectively.

Figure 7:
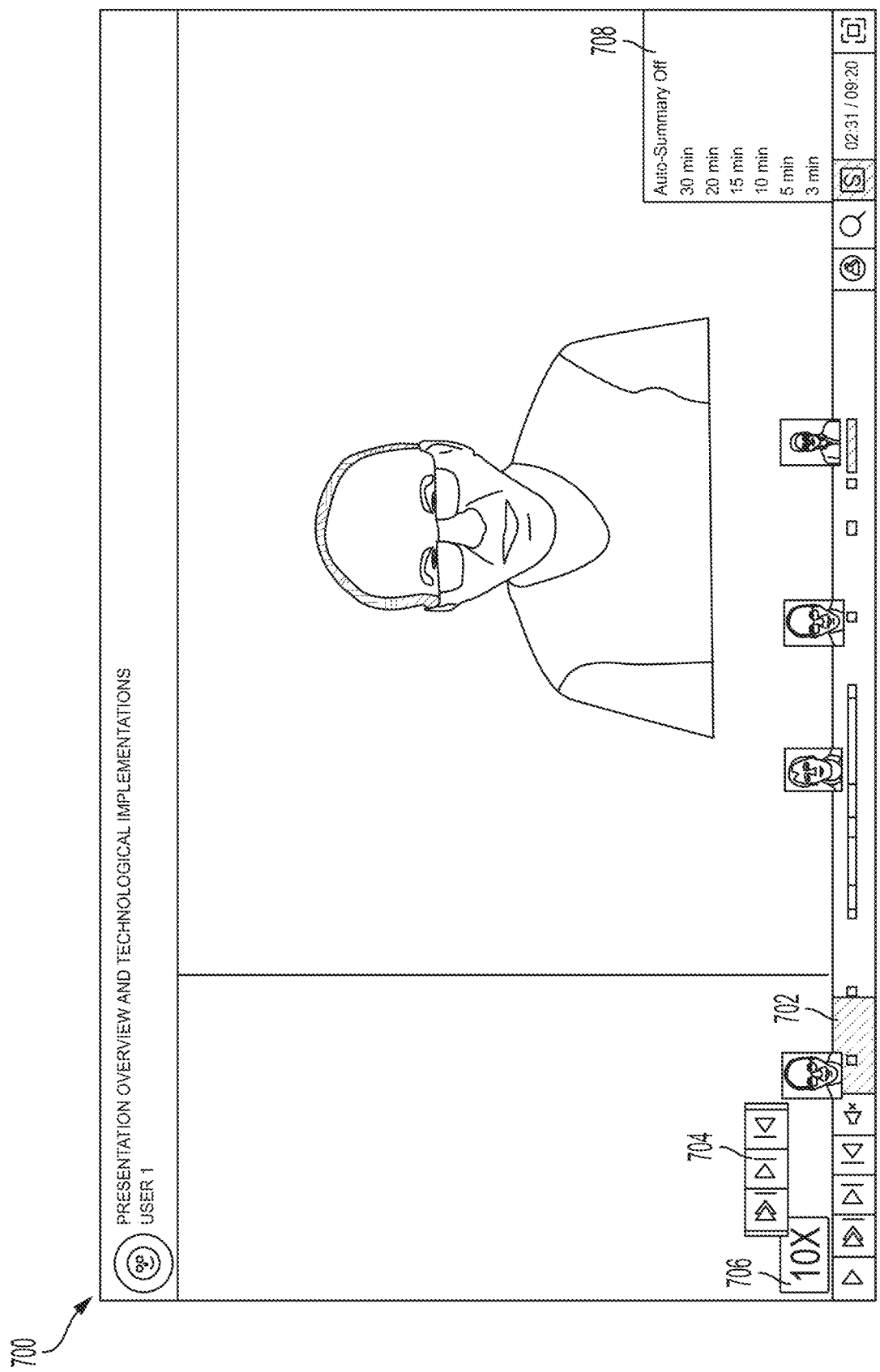

FIG. 7 illustrates an example display screen 700 that identifies interactive video playing in a player application operating on user computing device 104. In the example shown, in FIG. 7, timeline option 702 is provided that includes an interactive representation of the time of the entire interactive video. In addition, information is overlaid the timeline control 702, that identifies individual participants and events (demarcated as dots) and that can be used to define portions to be provided in an abridged version of the interactive video. Additionally, control 704 enables a user to play, fast-forward and rewind playback of the video. Speed control 706 identifies the playback rate (shown at 10 times rate) and abridged version control 708 includes selectable options for the user to define a length of time for an abridged version of the interactive video. For example, if the user selects 10 minutes, then the abridged version will run for 10 minutes and include content selected automatically as a function of coefficients and or other selections made by the user, such as shown and described herein.

Figure 8:
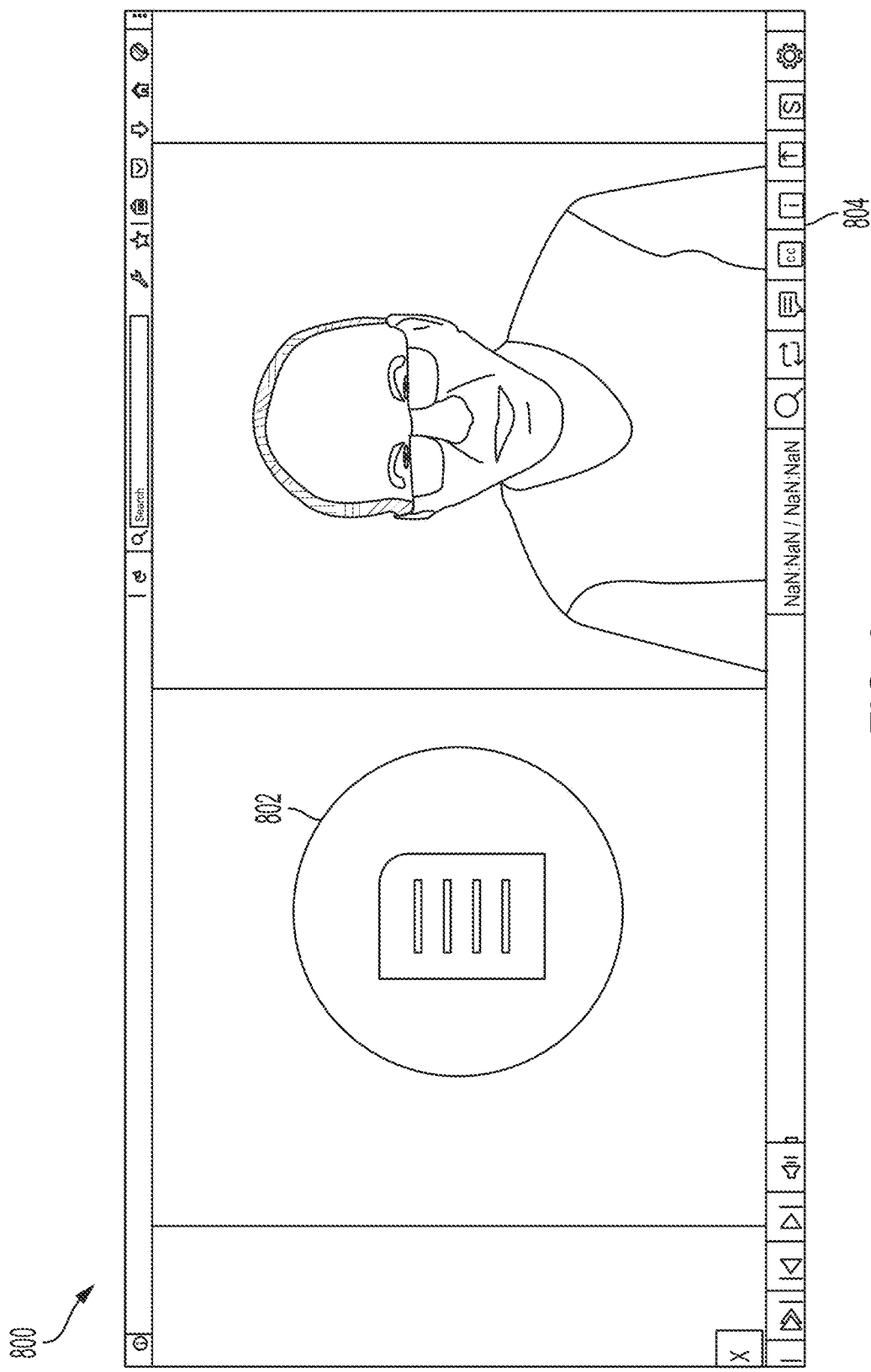

FIG. 8 illustrates an example display screen 800 that identifies interactive video playing in a player application operating on user computing device 104. In the example shown in FIG. 8, link 802 is illustrated for the viewer to select and pause play of the interactive video while accessing the content represented by link 802. Other graphical screen controls illustrated in FIG. 8 include control section 804, such as for searching, rewinding, adding comments, turning on and off closed captioning, information, forwarding or other suitable tools.

Figure 9:
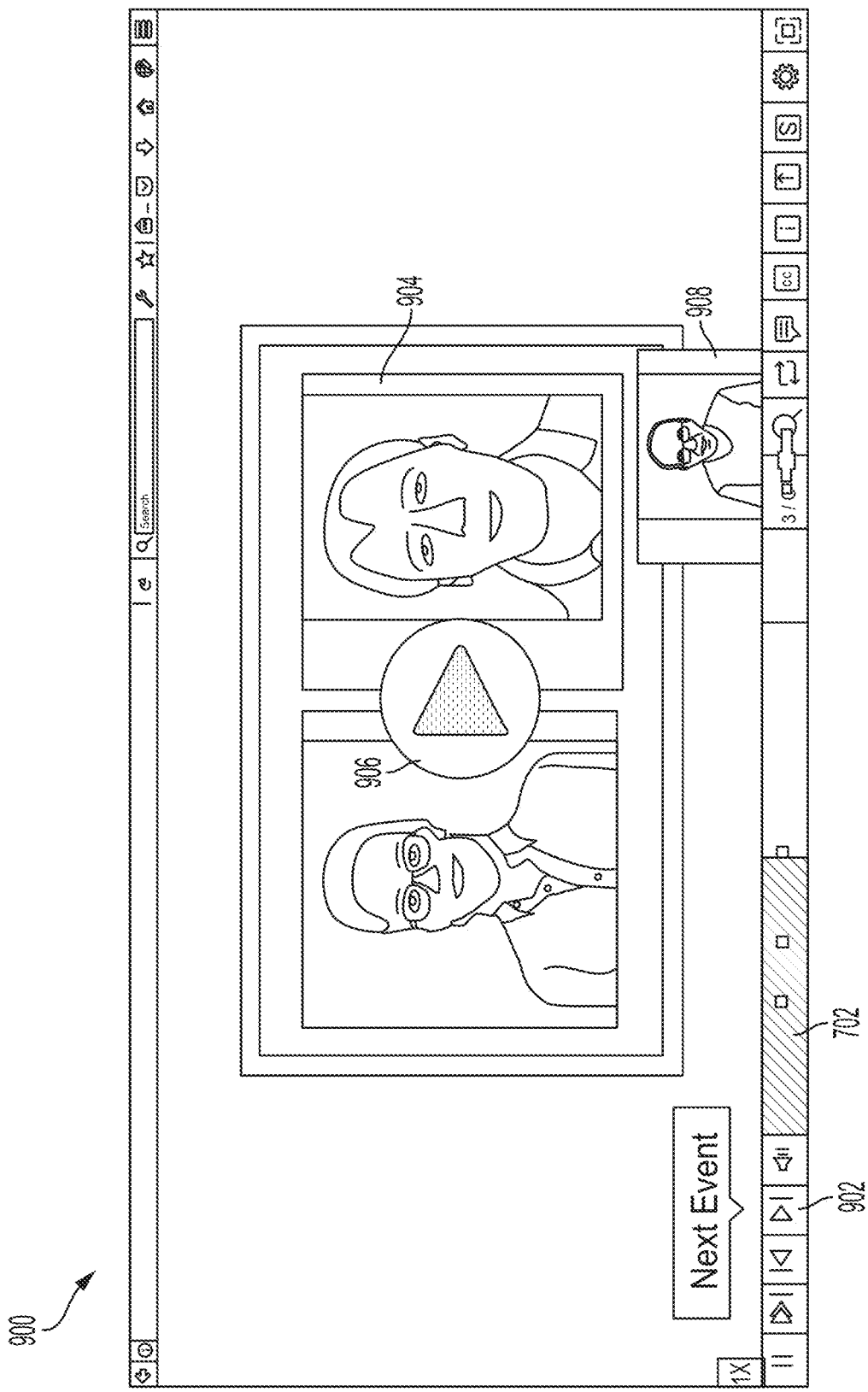

FIG. 9 illustrates an example display screen 900 that identifies interactive video playing in a player application operating on user computing device 104. In the example illustrated in FIG. 9, controls are provided for a user to fast-forward to a next respective event that is defined in accordance with the teachings herein. As the user selects next event control 902, the player fast-forwards through the interactive video to the next defined event. The portion of the interactive video that is displayed in screen portion 904 includes play icon 906 that, when selected, results in the video playing at that particular position in the video. The next respective event 908 is illustrated above the timeline 702 that will be fast forwarded to in the event next event control 902 is selected by the user.

Thus, as shown and described herein, the present application provides an improved system and method for providing interactive video and abridged versions thereof efficiently and easily. Portions of multimedia content can be assembled into a single packaged file, which can include metadata and other information in a self-contained repository. Video metadata is provided that identifies underlying assets of the package, and extrapolated metadata representing the video is packaged. Various forms of recognition processes are provided, such as audio recognition that is usable to get time coded information associated with an audio file as well as content therein. Other recognition processes include OCR, such as to identify a particular word (e.g., "Cisco") from content within the video, such as a respective presentation slide displayed therein. Additionally, changes in displayed content, such as when a new slide is displayed, prompts or triggers an instruction to be executed for recognition purposes. Further, artificial intelligence is utilized, such as to detect sentiment, such as when users are smiling or frowning. Video content can be embellished with information as a function of detection and recognition processes, which is usable for enhancing functionality, such as search capability, during playback. Moreover, enrichment is provided substantially in real-time when interactive video is created, and information and content is added to the payload provided in the package at or shortly after creation.

Furthermore, the teachings herein provide for improved consumption (e.g., viewing and listening) of content, including by providing custom and automatically defined abridged versions of interactive video. The result is improved operation of computing devices, such as to provide hours of content in minutes, without detracting from the user's ability to comprehend and enjoy the content.

In addition to a consumer or residential implementation of the present application, the teachings herein support enterprise use. For example, a business and/or enterprise implementation can integrate interactive and collaborative content, and serve the content efficiently across the enterprise. In addition, workplace collaboration tools are supported, and members of a given session can collaborate to create something together. Examples of collaboration and collaborative tools include a collaborative whiteboard, document creation and editing, mood board collaboration, general brainstorming, reviewing comps, training and instruction (with real-time assessment), focus group input, and can include realtime voting, sharing, collective web site and/or web application use that includes (but is not limited to) documents, spreadsheets, content management, project management, calendar planning or the like. Thereafter, the results of the collaboration can be disseminated efficiently across the enterprise.

Thus, as shown and described herein, in one or more implementations the present application provides systems and methods for participating video conferencing and sharing that can be layered with interactive content, including content that is available over one or more data communication networks, such as the Internet. Devices operating, for example, iOS, ANDROID, WINDOWS MOBILE, BLACKBERRY, MAC OS, WINDOWS or other operating systems are configured to provide functionality, such as an authoring tool and interface for developing distributable coordinated presentations, including videos that include customizable and interactive features for use by one or more end-users that receive the videos. Further, one or more software applications provide a viewing/interactive tool, referred to herein, generally, as a "consuming" interface for end-users who receive videos that are authored in accordance with the present application. Using the client interface, users may interact with videos as a function of touch and gestures, as well as other suitable interfaces, such as provided via an application that configures a smartphone or other mobile computing device to simulate a laser pointer, drawing tool, mouse, trackball, keyboard or other input device.

In one or more implementations of the present patent application, a processor configured with code processes information representing a selection event that occurred in the display unit. For example, a user makes a selection in a remote control software application operating on his or her mobile computing device (e.g., iPhone) in a portion of the display unit while the interactive media content in the display unit is provided therein. The processing that occurs can be to determine at least a relative time and location of the selection event that occurred in the second portion of the display. The information representing the selection event can be stored in one or more databases that are accessible to at least one computing device. The selection of an item can be processed to enable the interaction with at least a portion of the interactive media content at one of the remote devices associated with the selection event. This enables results of a respective interaction associated with the selection event to be viewable or otherwise provided at one particular remote device, but not viewable or otherwise provided at other of the remote devices.

Figure 10:
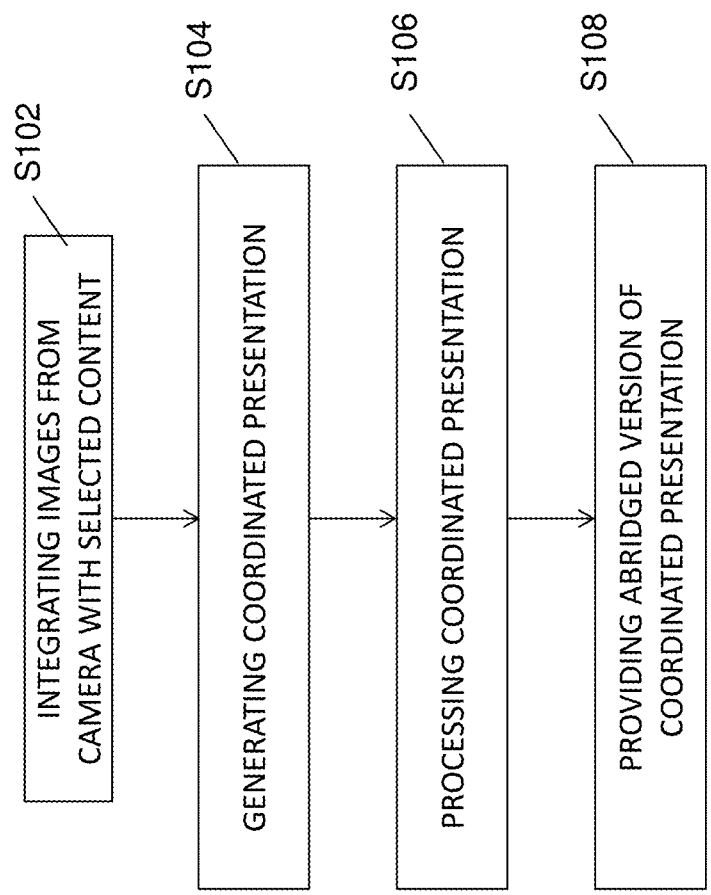
FIG. 10 is a flowchart identifying steps associated with an implementation of the present application.

FIG. 10 is a flowchart illustrating steps associated with providing an abridged coordinated presentation. At step S102, images from a camera, such as configured with a mobile computing device, are integrated with selected content provided by a user. The integrated images and content are used to generate a coordinated presentation (step S104). Thereafter, the coordinated presentation is processed (step S106) to provide an abridged version of the coordinated presentation at one or more of a plurality of remote devices (step S108). The abridged version can be provided as a function of determining events in the coordinated presentation, indexing the events, and using the indexed events to provide the abridged version (not shown).

Other functionality includes drawing and selection features, which is effective for explaining and highlighting features within a coordinated presentation, including during an interactive video conferencing session. Further, in one or more implementations, the present application supports providing virtual representations of respective users that are interfacing via a respective video conferencing session in accordance with the teachings herein. For example, one or more modules can be implemented to simulate the viewpoint for each of the respective users that one particular user is located "behind" the display screen configured with, or otherwise accessible by, user computing device 104.

Although many of the examples shown and described herein regard distribution of coordinated presentations to a plurality of users, the invention is not so limited. Although illustrated embodiments of the present invention have been shown and described, it should be understood that various changes, substitutions, and alterations can be made by one of ordinary skill in the art without departing from the scope of the present invention.

What is claimed is:

1. A system for providing respectively customizable interactive audio/video content to each of a plurality of computing devices, the system comprising:
at least one processor;
a memory that is accessible by the at least one processor;
wherein, when executing at least some code stored in the memory, the at least one processor is configured to:
generate a coordinated presentation by integrating in the memory, via a video mixer, one or more images captured by at least one camera respectively configured with at least one of a plurality of user computing devices during a video conferencing session, wherein the coordinated presentation is configured to enable respective interaction at each of a plurality of remote devices, such that results of a respective interaction at a particular remote device are viewable at the particular remote device but are not viewable at other of the remote devices, wherein the coordinated presentation is further configured to be transmitted to the one or more remote devices; and process the coordinated presentation to provide an abridged version of the coordinated presentation for at least one remote computing device.

2. The system of claim 1, wherein the abridged version is provided in a graphical user interface configured with a timeline.

3. The system of claim 1, wherein the coordinated presentation is processed by the at least one processor by:
determining a plurality of events in the coordinated presentation;
indexing each of the plurality of events; and
providing, in a timeline configured in a graphical user interface, the abridged version of the coordinated presentation as a function of the indexed events.

4. The system of claim 3, wherein the at least one processor is configured to assign a weight to at least one of the indexed events.

5. The system of claim 3, wherein at least one processor is configured to adjust the length of the abridged version of the coordinated presentation as a function of the indexed events.

6. The system of claim 3, wherein the events are detected by the at least one processor as a function of changes in content in the coordinated presentation.

7. The system of claim 6, wherein the changes represent changes in the content selected by the at least one user.

8. The system of claim 7, wherein the changes in the content include at least one of:
display of a presentation slide;
display of a person;
user interaction of content in the coordinated presentation;
user behavior within the coordinated presentation;
biometrics of at least one user within the coordinated presentation; and
a discussion of users in the coordinated presentation.

9. The system of claim 1, wherein the at least one processor is configured to provide a dashboard interface for users to define respective portions of the coordinated presentation that are to be provided or skipped in the abridged version of the coordinated presentation.

10. A method for providing respectively customizable interactive audio/video content to each of a plurality of computing devices, the method comprising:
accessing, by at least one processor, a memory that stores code for configuring the at east one processor;
generating, by the at least one processor, a coordinated presentation by integrating in the memory, via a video mixer, one or more images captured by at least one camera respectively configured with at least one of a plurality of user computing devices during a video conferencing session, wherein the coordinated presentation is configured to enable respective interaction at each of a plurality of remote devices, such that results of a respective interaction at a particular remote device are viewable at the particular remote device but are not viewable at other of the remote devices, wherein the coordinated presentation is further configured to be transmitted to the one or more remote devices; and
processing, by the at least one processor, the coordinated presentation to provide an abridged version of the coordinated presentation for at least one remote computing device.

11. The method of claim 10, wherein the abridged version is provided in a graphical user interface configured with a timeline.

12. The method of claim 1, further comprising:
determining, by the at least one processor, a plurality of events in the coordinated presentation;
indexing, by the at least one processor, each of the plurality of events; and
providing, by the at least one processor, in a timeline configured in a graphical user interface, the abridged version of the coordinated presentation as a function of the indexed events.

13. The method of claim 12, further comprising assigning, by the at least one processor, a weight to at least one of the indexed events.

14. The method of claim 12, further comprising adjusting, by the at least one processor, the length of the abridged version of the coordinated presentation as a function of the indexed events.

15. The method of claim 12, detecting, by the at least one processor, the events as a function of changes in content in the coordinated presentation.

16. The method of claim 15, wherein the changes represent changes in the content selected by the at least one user.

17. The method of claim 16, wherein the changes in the content include at least one of:
display of a presentation slide;
display of a person;
user interaction of content in the coordinated presentation;
user behavior within the coordinated presentation;
biometrics of at least one user within the coordinated presentation; and
a discussion of users in the coordinated presentation.

18. The method of claim 10, further comprising providing, by the at least one processor, a dashboard interface for users to define respective portions of the coordinated presentation that are to be provided or skipped in the abridged version of the coordinated presentation.

* * * * *